(12) United States Patent
Suzuki et al.

(10) Patent No.: US 7,583,474 B2
(45) Date of Patent: Sep. 1, 2009

(54) SUSPENSION AND LIMITER MECHANISM FOR A DATA STORAGE DEVICE

(75) Inventors: Kohichi Suzuki, Kanagawa (JP); Hiroyasu Tsuchida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 239 days.

(21) Appl. No.: 11/046,348

(22) Filed: Jan. 27, 2005

(65) Prior Publication Data

US 2005/0180052 A1 Aug. 18, 2005

(30) Foreign Application Priority Data

Feb. 18, 2004 (JP) ............................. 2004-040748

(51) Int. Cl.
*G11B 5/48* (2006.01)
(52) U.S. Cl. .................................................. 360/245.7
(58) Field of Classification Search .............. 360/244.2, 360/245.6, 245.7, 245.8, 245.3; 366/245.7, 366/245.3
See application file for complete search history.

(56) References Cited

U.S. PATENT DOCUMENTS

| | | | | |
|---|---|---|---|---|
| 4,309,732 A * | 1/1982 | Kronfeld et al. | ......... | 360/246.8 |
| 4,811,143 A * | 3/1989 | Ohashi et al. | ............ | 360/246.8 |
| 5,333,085 A * | 7/1994 | Prentice et al. | .......... | 360/245.7 |
| 5,815,349 A * | 9/1998 | Frater | ..................... | 360/245.7 |
| 5,838,517 A * | 11/1998 | Frater et al. | .............. | 360/245.7 |
| 5,995,326 A * | 11/1999 | Thayne et al. | ........... | 360/245.7 |
| 6,067,209 A * | 5/2000 | Aoyagi et al. | ............ | 360/254.7 |
| 6,181,525 B1 * | 1/2001 | Carlson | ................... | 360/245.7 |
| 6,195,237 B1 * | 2/2001 | Perez | ...................... | 360/245.7 |
| 6,226,153 B1 * | 5/2001 | Tokuyama et al. | ....... | 360/245.7 |
| 6,233,121 B1 * | 5/2001 | Pan | ......................... | 360/245.7 |
| 6,243,235 B1 * | 6/2001 | Fu et al. | .................. | 360/245.7 |
| 6,246,547 B1 * | 6/2001 | Bozorgi et al. | ........... | 360/245.3 |
| 6,266,212 B1 * | 7/2001 | Coon | ....................... | 360/234.5 |
| 6,320,729 B1 * | 11/2001 | Coon | ....................... | 360/245.7 |
| 6,417,996 B1 * | 7/2002 | Budde | ..................... | 360/245.7 |
| 6,424,498 B1 * | 7/2002 | Patterson et al. | ......... | 360/245.7 |
| 6,445,546 B1 * | 9/2002 | Coon | ....................... | 360/245.7 |
| 6,556,384 B1 * | 4/2003 | Inoue et al. | .............. | 360/245.7 |
| 6,587,311 B1 * | 7/2003 | Niijima et al. | .............. | 360/255 |
| 6,847,591 B1 * | 1/2005 | Murakami et al. | ......... | 369/13.2 |
| 7,298,590 B1 * | 11/2007 | Mei | ........................ | 360/245.7 |
| 7,450,347 B2 * | 11/2008 | Suzuki et al. | .............. | 360/255 |
| 7,489,478 B2 * | 2/2009 | Agari et al. | .............. | 360/245.7 |
| 2002/0027747 A1 * | 3/2002 | Budde | ..................... | 360/245.7 |
| 2002/0075602 A1 * | 6/2002 | Mangold et al. | .......... | 360/245.7 |

(Continued)

FOREIGN PATENT DOCUMENTS

JP 10-255423 A 9/1998

*Primary Examiner*—Brian E Miller
(74) *Attorney, Agent, or Firm*—Townsend and Townsend and Crew LLP; John Henkhaus

(57) ABSTRACT

In a suspension used in an actuator of a hard disk drive, a limiter mechanism is to be provided which produces little dust and which can restrict deformation of a gimbals even against a strong shock. According to one embodiment, when a weak shock is applied to the suspension, a limiter tab and a back side of a load beam come into contact with each other to prevent a gimbals from being largely deformed by the shock. Since deformation of the gimbals is restricted by surface contact of both load beam and limiter tab, the generation of dust is suppressed effectively. When a strong shock is applied to the suspension, the limiter tab is deformed and a projecting portion of a restrictive aperture and an end portion of a limiter tab aperture come into contact with each other. The projecting portion retains the limiter tab to restrict a further deformation of the gimbals.

20 Claims, 8 Drawing Sheets

U.S. PATENT DOCUMENTS

2004/0008449 A1* 1/2004 Girard ..................... 360/245.7
2004/0032695 A1* 2/2004 Sassine et al. ........... 360/245.7
2004/0246625 A1* 12/2004 Tsuchida et al. ......... 360/244.2
2006/0034017 A1* 2/2006 Agari et al. ............... 360/245.7
2006/0092571 A1* 5/2006 Kang ...................... 360/245.7

* cited by examiner

SUSPENSION AND LIMITER MECHANISM FOR A DATA STORAGE DEVICE

CROSS-REFERENCES TO RELATED APPLICATIONS

This application claims priority from Japanese Patent Application No. JP2004-040748, filed Feb. 18, 2004, the entire disclosure of which is incorporated herein by reference.

BACKGROUND OF THE INVENTION

The present invention relates to suspensions and data storage devices. In particular, the present invention relates to a suspension having a limiter mechanism for restricting deformation of the suspension and a data storage device having the suspension.

Information storage/reproducing devices are known which use an optical disk, a magnetic tape or other various media. Above all, a hard disk drive is used widely as a storage device in a computer and is one of storage devices essential to computer systems available at present. The application there is not limited to computer systems. Hard disk drives are used, for example, in moving image storage/reproduction apparatus, car navigation systems, and removable memories for use in digital cameras. Thus, the use of the hard disk drive is spreading more and more because of excellent characteristics thereof.

The hard disk drive includes a magnetic disk for the storage of data, a head for read and/or write of data from and/or to the magnetic disk, and an actuator for moving the head to a desired position above the magnetic disk. The actuator is moved pivotally about a pivot shaft by means of a voice coil motor, thereby causing the head to move radially over the magnetic disk which is rotating. As a result, the head can access a desired track formed on the magnetic disk and perform data read/write processing. The head has a write element which converts an electric signal into a magnetic field in accordance with data to be stored to the magnetic disk and/or a read element which converts a magnetic field induced from the magnetic disk into an electric signal. The head is further provided with a slider on a surface of which is (are) formed the write element and/or the read element.

The actuator is provided with a suspension having elasticity, and the head is fixed to the suspension. Pressure induced by the stiction of air present between an ABS (Air Bearing Surface) of the head facing the magnetic disk and the rotating magnetic disk balances with pressure which is applied toward the magnetic disk by the suspension, whereby the head can float over the magnetic disk with a certain gap. The suspension includes gimbals which hold the head on its side facing the magnetic disk and a load beam which holds the gimbals on its side facing the magnetic disk. The gimbals is formed deformably so that the slider can tilt in a predetermined direction to absorb axial run-out or the like of the magnetic disk.

On the other hand, to prevent an excessive deformation of the gimbals, it is known to be effective to provide the suspension with a limiter mechanism for limiting the spacing between the gimbals and the load beam. An example of the limiter mechanism is disclosed in Japanese Patent Laid-open No. 10-255423. FIG. 9 illustrates the construction of the limiter mechanism disclosed in the Japanese Patent reference. The suspension has a limiter mechanism 903 for limiting the range of movement of the gimbals 902 relative to a load beam 901. Toward the ends of the limiter mechanism 903 the load beam 901 has a plurality of limiting elements 904 having respective engaging surfaces, while the gimbals 902 has a plurality of engaging tabs 905 having respective stopper surfaces opposed to one engaging surfaces of the limiting elements 904.

To functionally operate on and accommodate the engaging tabs 905 of the gimbals, the limiting elements 904 are connected to a body portion of the load beam 901 through one or more bent portions. Each of the limiting elements 904 is first etched to extend transversely from the load beam 901 and is then bent along a longitudinal bending line at an angle of approximately 90° so that the engaging surface of the limiting element 904 is positioned just under the stopper surface of the corresponding engaging tab 905. Thus, each limiting element 904 is formed as an L-shaped accessory. In this way, the range of movement of the gimbals 902 is limited while the gimbals is prevented from being drawn away from a load point dimple 906 of the suspension.

BRIEF SUMMARY OF THE INVENTION

As described above, it is effective for the suspension to be provided with a limiter mechanism for limiting deformation of the gimbals. However, it is desired that the limiter mechanism satisfies several different requirements. One of the requirements is that dust which can be generated with operation of the limiter mechanism should be suppressed to a minimum. Within the hard disk drive, head crash can occur due to inclusion of dust between the head and the medium. In this regard, since the limiter mechanism utilizes contact between members to restrict deformation of the gimbals, it is desirable that dust resulting from this contact be suppressed to a minimum.

Another requirement is that the limiter mechanism should function effectively also against a strong shock from the exterior to prevent an excessive deformation of the gimbals. In particular, in the suspension disclosed in the above Japanese Patent reference, the range of movement of the gimbals 902 is limited by the engaging tabs 905 and the limiting elements 904, but in the event the limiting elements 904 should become disengaged from the engaging tab 905, it is impossible to restrict deformation of the gimbals 902 to a further extent.

The present invention has been accomplished with the above circumstances as background and it is a feature of the invention to provide a limiter mechanism in a suspension capable of effectively suppressing the generation of dust, thereby suppressing malfunctioning of an information storage device, without deteriorating dynamic characteristics of a head, and further capable of effectively preventing an excessive deformation of the suspension.

In a first aspect of the present invention there is provided a suspension for holding a head adapted to access data stored in a medium. The suspension includes a deformable gimbals which holds the head; and a load beam which holds the gimbals on a first surface thereof. The load beam has a restrictive aperture. The gimbals includes a limiter tab extending through the restrictive aperture from a side of the first surface to a side of a back surface of the first surface. The limiter tab includes an opposed portion having an opposed surface opposed to the back surface. The opposed surface is adapted to come in contact with part of the back surface to restrict deformation of the gimbals in a direction away from the first surface at a first amount of deformation. The load beam includes a retaining portion for retaining the opposed portion at a position different from the part of the back surface to restrict deformation of the gimbals in a direction away from the first surface at a second amount of deformation larger than the first amount of deformation. Since the restriction of deformation at the first amount of deformation is made by surface contact, it is possible to suppress the generation of dust. Further, since deformation of the gimbals is restricted at the different amounts of deformation, it is possible to restrict deformation effectively even against a strong shock.

It is preferable that the opposed surface of the opposed portion be opposed to the part of the back surface of the load beam with a gap defined therebetween. Since the gap is defined between the opposed surface and the part of the back surface, it is possible to suppress the generation of dust caused by unnecessary contact.

In some embodiments, a limiter tab aperture is formed in the limiter tab and the retaining portion has a projecting portion formed at an end of the restrictive aperture and retains the limiter tab by contact of the projecting portion with an end of the limiter tab aperture. Since the limiter tab aperture is formed in the limiter tab, it is possible to reduce the weight of the limiter tab.

Alternatively, the limiter tab is formed in such a manner that the opposed surface and the back surface are substantially parallel to each other in other embodiments. As a result, unnecessary contact between the opposed surface and the back surface is further suppressed so that the generation of dust can be suppressed. Alternatively, the limiter tab has a limiter tab arm portion extending through the restrictive aperture from the side of the first surface to the side of the back surface, and the opposed portion is bent from the limiter tab arm portion and extends so that the opposed surface is opposed to the back surface with a gap defined therebetween. Since the opposed surface is opposed to the back surface with a gap defined therebetween, unnecessary contact between the opposed surface and the back surface is suppressed so that the generation of dust can be suppressed.

In specific embodiments, the gimbals has a gimbal tongue to which the head is fixed, and the limiter tap is formed on a rear side of the gimbal tongue. As a result, it is possible to restrict movement of the rear side of the gimbal tongue and hence possible to restrict deformation of the gimbal tongue effectively. Preferably, the gimbals further has a gimbal tab formed on a front side of the gimbal tongue and projecting at a front end of the gimbals. With the gimbal tabs and the limiter tabs formed on both front and rear sides, deformation of the gimbal tongue can be restricted more effectively when the head is retracted to a ramp.

In some embodiments, the gimbals has a gimbal tongue to which the head is fixed, and the limiter tab is formed at a rear end of the gimbal tongue. Preferably, the limiter tab arm portion has a limiter tab arm portion, which extends through the restrictive aperture from the first surface side to the rear side and which is bent relative to the gimbal tongue, the opposed portion is bent relative to the limiter arm tab portion in a direction opposite to the bent direction of the limiter tab arm portion, a limiter tab aperture is formed in the limiter tab, and the retaining portion has a projecting portion formed at a rear end of the restrictive aperture and retains the limiter tab by contact of the projecting portion with an end of the limiter tab aperture. Since the limiter tab has such a shape, press working becomes easier and the suspension can be produced efficiently. Preferably, the distance in the longitudinal direction of the load beam between the first surface-side bent portion of the limiter tab arm portion and a rear end of the opposed portion is shorter than the distance in the longitudinal direction of the load beam between an end of the restrictive aperture to which the opposed portion is opposed and a front end of the projecting portion. As a result, the limiter tab can be machined before it is inserted into the restrictive aperture and thus the production of the suspension can be done more efficiently.

In specific embodiments, a limiter tab aperture is formed in the limiter tab, the retaining portion has a projecting portion, which is formed at an end of the restrictive aperture and which extends through the limiter tab aperture, and the retaining portion retains the limiter tab by contact of the projecting portion with an end of the limiter tab aperture. Since the limiter tab is retained by contact of the projecting portion with the limiter tab aperture end, the limiter tab can be retained positively.

In a second aspect of the present invention there is provided a data storage device comprising a storage disk for the storage of data, a head adapted to access the data stored in the storage disk, and an actuator for moving the head for access to the storage disk, the actuator having a suspension for holding the head and a drive mechanism which generates a driving force for moving the head. The suspension includes a deformable gimbals which holds the head and a load beam which holds the gimbals on a first surface thereof, the load beam having a restrictive aperture. The gimbals has a limiter tab extending through the restrictive aperture from the side of the first surface to the side of a back surface of the first surface. The limiter tab has an opposed portion, which has an opposed surface opposed to the back surface and which is adapted to come in contact with the back surface to restrict deformation of the gimbals in a direction away from the first surface at a first amount of deformation. The load beam has a retaining portion for retaining the limiter tab to restrict deformation of the gimbals in a direction away from the first surface at a second amount of deformation larger than the first amount of deformation. Since the restriction of deformation at the first amount of deformation is made by surface contact, it is possible to suppress the generation of dust. Since deformation of the gimbals is restricted at the different amounts of deformation, it is possible to restrict deformation effectively even against a strong shock.

In some embodiments, the opposed surface is opposed to the back surface of the load beam with a gap defined therebetween. Preferably, the limiter tab is formed in such a manner that the opposed surface is paralleled to the back surface. Since the opposed portion is opposed to the back surface with a gap defined therebetween, unnecessary contact between the opposed portion and the back surface is suppressed and it is possible to suppress the generation of dust. Since the retaining portion retains the opposed portion at a portion different from the opposed surface, it is possible to suppress deformation of the gimbals.

In specific embodiments, a gimbals aperture is formed in the gimbals, the gimbals has a gimbal tongue, which projects from an end of the gimbals aperture on the side opposite to the drive mechanism and to which the head is fixed. In addition, the limiter tab is formed at an end of the gimbal tongue on the drive mechanism side. As a result, it is possible to restrict movement of the gimbal tongue on the side of the drive mechanism and restrict deformation of the gimbal tongue effectively.

In some embodiments, the data storage device further comprises a ramp mechanism to which the head is retracted, and a tab is formed at a front end of the load beam. The tab is adapted to come into contact with a surface of the ramp mechanism, thereby causing the actuator to rest on the ramp mechanism. Preferably, a gimbal tab is formed at a front tip of the gimbals with a gap defined between the gimbal tab and the surface of the ram mechanism so as to come in contact with the surface of said ramp mechanism for restricting deformation of said gimbals. With the gimbal tab and the limiter tab, deformation of the gimbal tongue can be restricted effectively when the head is retracted to the ramp mechanism.

According to the present invention, in restricting deformation of the gimbals which holds the head, it is possible to suppress the generation of dust, and deformation of the gimbals can be restricted effectively even against a strong shock.

DETAILED DESCRIPTION OF THE INVENTION

Figure 1:
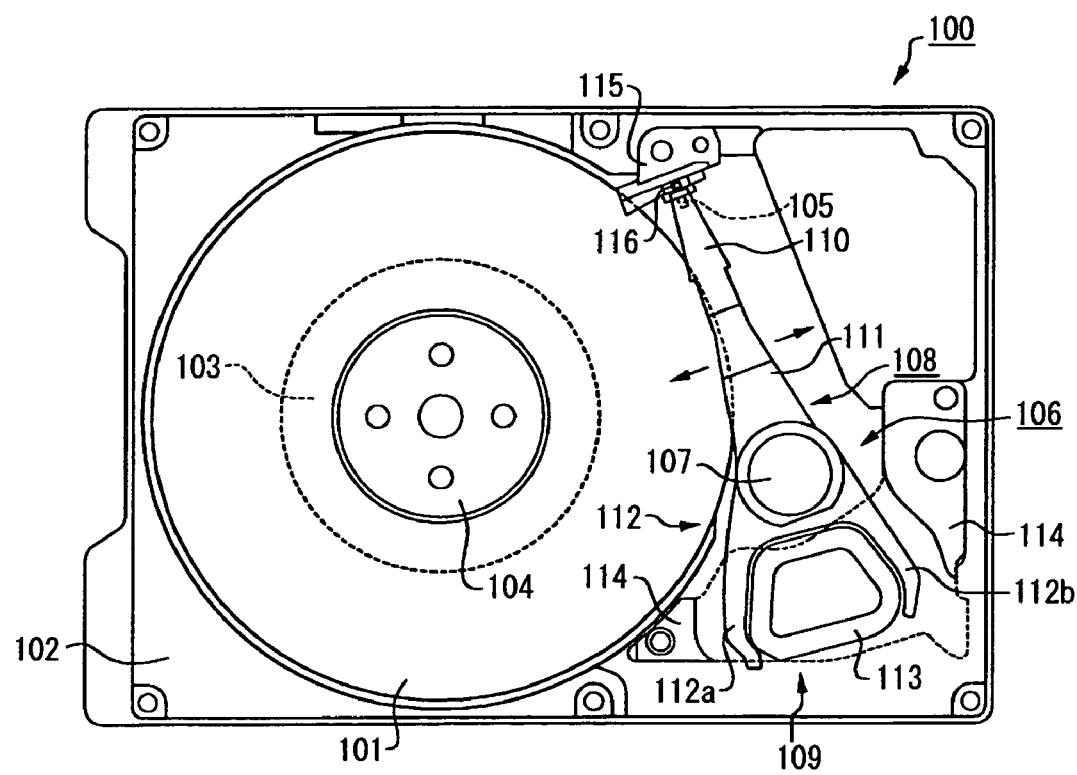
FIG. 1 is a plan view showing a schematic construction of a hard disk drive according to an embodiment of the present invention.

Embodiments to which the present invention is applicable will be described below. The following description is for explanation of the embodiments and the present invention is not limited to the following embodiments. To clarify the explanation, omissions and simplifications are made as necessary in the following description and the drawings. With respect to various elements of the following embodiments, those skilled in the art can easily make changes, addition and conversions within the scope of the present invention. In the drawings, the same elements are identified by the same reference numerals and, for the clarification of explanation, tautological explanations will be omitted as necessary.

FIG. 1 is a top view showing a schematic construction of a hard disk drive 100 embodying the present invention. In the same figure, reference numeral 101 denotes a medium (storage disk) for the storage of data. More particularly, the medium 101 is a magnetic disk as a non-volatile storage disk having a magnetic layer which is adapted to be magnetized to store data. Reference numeral 102 denotes a base for accommodating various components of the hard disk drive 100. The base 102 is fixed through a gasket (not shown) to a cover (not shown) which closes an upper opening of the base 102, thereby constituting a disk enclosure. The base 102 can accommodate the components of the hard disk drive 100 in a hermetically closed state.

Reference numeral 103 denotes a spindle motor and 104 denotes a hub provided on the spindle motor 103. Numeral 105 denotes a head for write and/or read of data to and/or from the magnetic disk 101 which data are inputted and outputted to and from a host (not shown). The head 105 has a write element which converts an electric signal to a magnetic field in accordance with data to be recorded to the magnetic disk 101 and/or a read element which converts the magnetic field provided from the magnetic disk 101 into an electric signal, as well as a slider on a surface of which the write element and/or the read element are (is) formed.

Reference numeral 106 denotes an actuator for holding and moving the head 105. The actuator 106 is held pivotably by a pivot shaft 107 and includes an actuator arm 108 and a VCM (voice coil motor) 109 as a drive mechanism. The actuator arm 108 includes such components as a suspension 110, a head arm 111 and a coil support 112 successively from a front end portion thereof where the head 105 is disposed. The construction of the actuator arm 108 will be described in detail later with reference to FIG. 2 and other figures. The actuator 106, the actuator arm 108 and the components thereof will be described below, assuming that the side of the pivot shaft 107 is a rear side and the side of the tip or distal end is a front side.

Reference numeral 113 denotes a flat coil and 114 denotes an upper stator magnet holding plate fixed to the base 102. The upper stator magnet holding plate 114 is illustrated in a state in which its principal portion is cut away for convenience' sake, and its contour is illustrated with a broken line. Although not shown, a lower stator magnet holding plate is disposed below the flow coil 113 so as to sandwich the flat coil 113 between the lower stator magnet holding plate and the upper stator magnet holding plate 114. The VCM 109 includes the flat coil 113, a stator magnet (not shown) fixed to the upper stator magnet holding plate 114, and a stator magnet (not shown) fixed to the lower stator magnet holding plate. Reference numeral 115 denotes a ramp mechanism for allowing the head 105 to be retracted thereto from the magnetic disk 101 when the disk stops rotation. Reference numeral 116 denotes a tab formed at the tip of the suspension 110. The actuator 106 used in this embodiment is also applicable to the CCS (Contact Start and Stop) system in which when the head 105 does not perform write and/or read of data, it is retracted to a zone located on the inner periphery side of the magnetic disk 101.

The magnetic disk 101 is held integrally by the hub 104 of the spindle motor 103 which is fixed to the bottom of the base 102, and is rotated at a predetermined speed by the spindle motor 103. When the hard disk drive 100 is inoperative, the magnetic disk 101 is at standstill. The coil support 112 held pivotably by the pivot shaft 107 is formed with coil support arms 112a and 112b. The coil support arms 112a and 112b hold the flat coil 113 on the side opposite to the head arm 111 with respect to the pivot shaft 107. In accordance with a drive signal flowing from a controller (not shown) to the flat coil 113 the VCM 109 causes the actuator arm 108 to pivot about the pivot shaft 107, allowing the head 105 to move to a position above, or the outside of, the magnetic disk 101.

To read or write data from or to the magnetic disk 101, the actuator 106 causes the head 105 to move to a position above the data area on the surface of the rotating magnetic disk 101. With pivotal movement of the actuator 106, the head 105 moves radially of the surface of the magnetic disk 101, whereby the head can access a desired track. Pressure induced by the viscosity of air present between ABS (Air Bearing Surface) of the slider facing the magnetic disk 101 and the rotating magnetic disk 101 balances with pressure applied toward the magnetic disk 101 by the suspension 110, whereby the head 105 floats over the magnetic disk with a certain gap defined therebetween.

When the rotation of the magnetic disk 101 stops, the head 105 comes into contact with the surface of the magnetic disk 101, giving rise to problems such as damage to the data area due to an attractive phenomenon or failure to rotate the magnetic disk. To avoid such problems, when the rotation of the magnetic disk 101 is about to stop, the actuator 106 causes the head 105 to retract from the data area to the ramp mechanism 115. The actuator 106 pivots toward the ramp mechanism 115 and the tab 116 formed at the tip of the actuator moves while sliding on the surface of the ramp mechanism 115 and gets on a parking surface formed on the ramp mechanism, whereby the magnetic head 105 is unloaded. For loading, the actuator 106 which has been supported on the parking surface leaves the ramp mechanism 115 and moves to a position above the surface of the magnetic disk 101.

In the above description, for the simplification of explanation, the hard disk drive is configured to have the one magnetic disk 101 with one-side storage. However, for both-side storage there is provided another suspension for holding a head adapted to scan the other storage surface, and the suspension is fixed to the coil support 112 through a head arm at a position at which it is overlaid through a predetermined spacing on the suspension 110 shown in FIG. 1. For a plurality of magnetic disks with both-side storage, the magnetic disks are integrally held by the hub 104 at predetermined spacings in the direction of the rotating shaft of the spindle motor 103. Suspensions for holding heads adapted to scan storage surfaces are provided by the number of the storage surfaces and are fixed to the coil support 112 through head arms at positions at which they are overlaid at predetermined spacings on the suspension 110 shown in FIG. 1.

Figure 2:
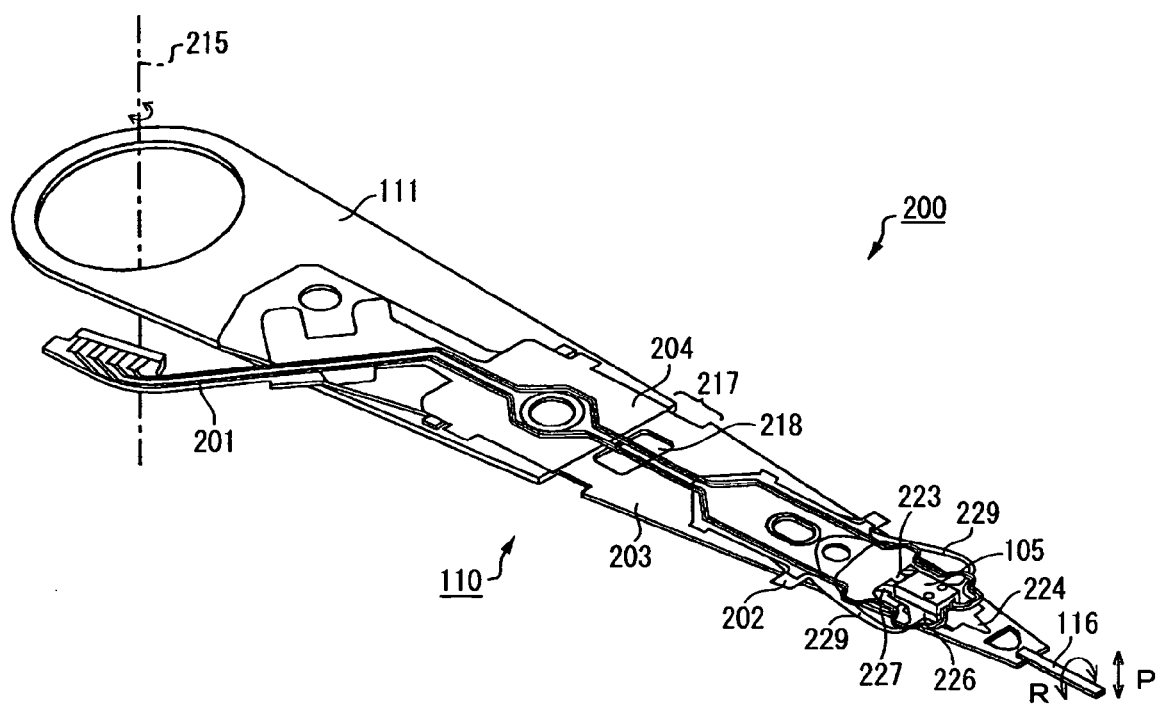
FIG. 2 is an exploded perspective view showing a schematic construction of a head gimbal assembly used in the embodiment.
Figure 3:
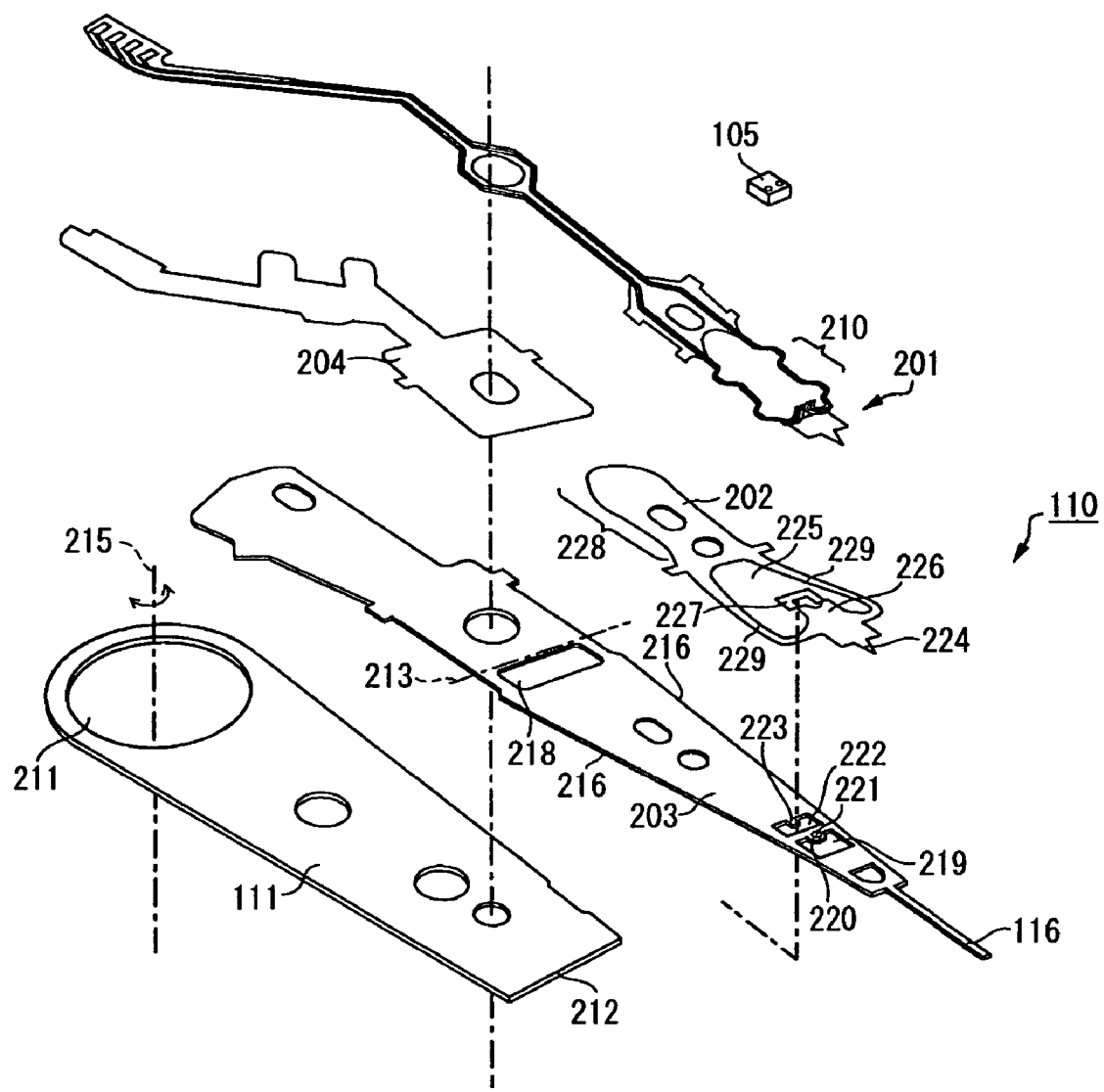
FIG. 3 is a view showing the construction of a limiter mechanism used in the embodiment.

FIG. 2 is a perspective view showing a schematic construction of a head gimbal assembly 200 used in the embodiment. FIG. 2 illustrates the construction of the head gimbal assembly 200 as seen from the magnetic disk 101. FIG. 3 is an exploded perspective view showing components of the head gimbal assembly 200. In this embodiment, the head gimbal assembly 200 is composed of a plurality of components, including the head 105, a FPC (Flexible Printed Circuit 201), the suspension 110 and head arm 111. In this embodiment, the suspension 110 is composed of a plurality of components, including gimbals 202, a load beam 203 and a mounting plate 204.

In the FPC 201, a plurality of leads in noncontact with each other are formed integrally with an insulating sheet formed of a polyimide film. One group of ends of the leads constitute a multi-connector which is connected to an internal circuit such as a head amplifier. The opposite ends of the leads on the side of the head 105 are bent for connection with pads formed on the slider of the head 105. The FPC 201 is fixed to the gimbals 202 and the mounting plate 204 with use of an adhesive and, where required, is covered from the outside with an epoxy resin for example.

To avoid impeding the motion of the gimbals 202, the FPC 201 is disposed so that a part thereof may be brought into a floating state in the air without being fixed to the gimbals 202 or the mounting plate 204. For example, the FPC 201 has a curved portion 210 so as not to impede the motion of the gimbals 202, which curved portion 210 is in a floating state in the air without being fixed to the gimbals 202. To facilitate deflection of the FPC 201 it is preferable that the curved portion 210 be formed on the wiring. However, without forming the curved portion 210, the FPC 201 may be formed using straight wiring.

The head arm 111 is typically formed of stainless steel and required shapes are formed therein by etching, including a rear aperture 211 for insertion of the pivot shaft 107. The head gimbal assembly 200 pivots about a pivot center 215 which is the center of the rear aperture 211. A load beam 203 is welded by laser spot welding onto the surface of the head arm 111 on the side opposed to the magnetic disk 101. The head arm 111 and the load beam 203 are welded together in such a manner that a front end side 212 of the head arm 111 is registered with an indication line 213 described on the load beam 203. The load beam 203 is formed of stainless steel for example and functions as a precise thin plate spring. The shape of the load beam 203 is determined so as to meet the requirement that the load beam should be thin and light-weight and be able to maintain the required rigidity. A tab 116 is formed at the front tip of the load beam 203.

Both edges extending in the longitudinal direction (from the tab 116 (front side) toward the pivot center 215 (rear side)) of the load beam are bent in a direction (downward in the figure) away from the magnetic disk 101 by press working except a hinge portion close to the front end side 212 of the head arm 111, to form flange portions 216. The flange portions 216 make it possible to enhance the rigidity of the load beam 203. The hinged portion, indicated at 217, is formed with not the flanges 216, but an aperture 218. The hinge portion 217 has elasticity and thereby induces a load on the head 105. At the hinge portion 217 the load beam 203 is bent at a predetermined angle. Since this bending is based on plastic deformation, this angle is maintained in a natural state.

An approximately square aperture 219 is formed in the load beam 203 at a position close to the front tip of the load beam. The aperture 219 is used for clamping the head 105 in the course of fixing the head 105 to the gimbals 202. A projecting portion 220 projecting toward the center of the aperture 219 is formed nearly centrally of one rear side (the side of the pivot center 215) of the aperture 219. On the projecting portion 220 is formed a dimple 221 which is raised toward the gimbals 202 (toward the head 105 (upward in the figure)).

The dimple 221 may be formed on the surface of the load beam 203 opposed to the gimbals 202 without formation of the aperture 219. This depends on the manufacturing process. The load beam 203 is formed with a restrictive aperture 222 of a generally square shape behind (on the side opposite to the tab 116) the aperture 219. A projecting portion 223 projecting toward the center of the restrictive aperture 222 and functioning as a retaining portion is formed nearly centrally of one rear side (the side of the pivot shaft 215) of the restrictive aperture 222. The restrictive aperture 222 and the projecting portion 223 will be described in detail later.

Both the mounting plate 204 and gimbals 202 are welded to the load beam 203 by laser spot welding. The mounting plate 204 is welded to the rear portion of the load beam 203, while the gimbals 202 is welded to the front portion of the load beam 203. The mounting plate 204 may be formed of stainless steel. The gimbals 202 may also be formed of stainless steel and possesses a desired elasticity. A gimbal tab 224 is formed at the front end of the gimbals 202. In the event the head 105 receives an external shock when retracted to the ramp mechanism 115, the gimbal tab 224 comes into contact with the ramp mechanism 115, whereby the head gimbal assembly 200 can be prevented from being damaged.

An aperture 225 is formed in the front portion of the gimbals 202 and behind the gimbal tab 224. A gimbal tongue 226 projecting toward the center of the aperture 225 is formed nearly centrally of one front side (the side of the gimbal tab 224) of the aperture 225. With use of an epoxy resin of low elasticity for example, the head 105 is fixed to the gimbal tongue 226 which projects backward from one front side of the aperture 225. A limiter tab 227 which restricts the motion of the gimbals is formed at the rear end of the gimbal tongue 226. A limiter mechanism including the limiter tab 227 will be described in detail later.

At a gimbals base portion 228 formed behind the aperture 225 the gimbals 202 is welded to the load beam 203, but the front portion of the gimbals including the gimbal arms 229 and the gimbal tongue 226 is not welded, assuring a free state. The two gimbal arms 229 extending along side ends of the aperture from the gimbals base portion 228 define an end of the aperture 225 and elastically support the gimbal tongue 226 which is formed in the front portions of the gimbal arms 229 contiguously to the gimbal arms.

Figure 5:
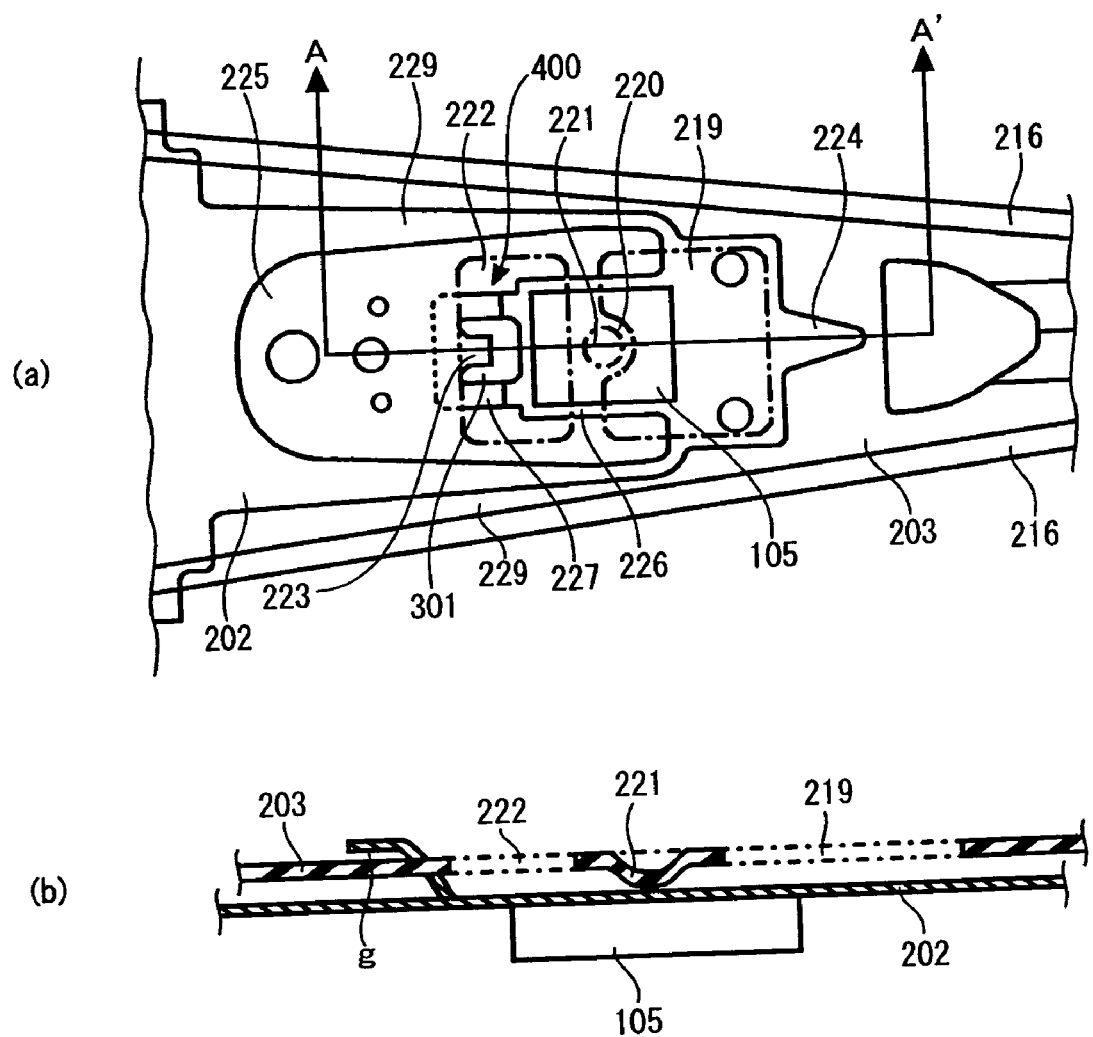
FIG. 5 is a view showing the construction of the limiter mechanism.

The gimbal tongue 226 is supported at one point by the dimple 221 of the load beam 203 (see FIG. 5(b)). The gimbal arms 229 are in a warped state and the gimbal tongue 226 is pushed against the dimple 221 with the elastic force of the gimbal arm. The gimbal tongue 226 can cause the head 105 to pivot in a pitching direction (direction P in FIG. 2) or in a rolling direction (direction R in FIG. 2) and can not only absorb axial run-out and tilting in assembling of the magnetic disk 101 but also exhibit a high follow-up performance in tracking the magnetic disk 101.

Figure 4:
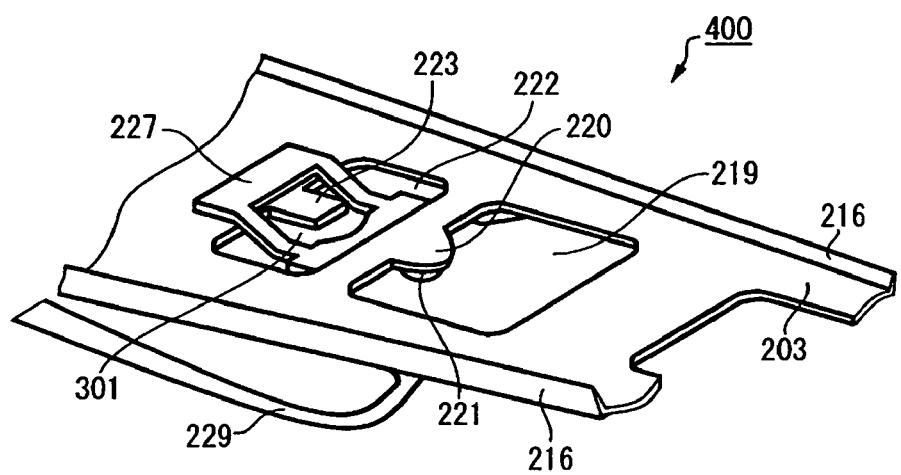
FIG. 4 is a view showing the construction of the limiter mechanism.

FIG. 4 is a partial enlarged view of the front portion of the head gimbal assembly 200, showing a state in which the head gimbal assembly 200 is seen from the side of the load beam 203. FIG. 5A is a plan view showing the front portion of the head gimbal assembly 200 and FIG. 5B is a cross-sectional view of the portion taken along line A-A of FIG. 5A. FIG. 5A shows a state in which the head gimbal assembly 200 is seen from the side of the gimbals 202. In FIGS. 4, 5A and 5B, the construction of the head gimbal assembly is partially omitted as necessary for the clarification of explanation.

Referring to FIGS. 4, 5A and 5B, the construction of the limiter mechanism 400 used in this embodiment will now be described in detail. The head gimbal assembly 200 in this embodiment has a limiter mechanism 400 for restricting deformation of the gimbals 202 or movement of the head 105. The limiter mechanism 400 is provided with a restrictive aperture 222 formed in the load beam 203, a projecting portion 223 projecting from one side end of the restrictive aperture 222, and a limiter tab 227 formed at a rear end, i.e., on the drive mechanism side, of the gimbal tongue 226. By restricting the spacing between the gimbals 202 (or the head 105) and the load beam 203, the limiter mechanism 400 can fulfill the function of assisting the operation of pulling up the head 105 in unloading the head or the function of preventing an excessive deformation of the gimbals 202 when an external shock is applied to the gimbals.

In an assembled state of the suspension 110 the limiter tab 227 is inserted into the restrictive aperture 222. The limiter tab 227 extends through the restrictive aperture 222 from the surface of the load beam 203 opposed to the gimbals 202 toward the bottom side opposite with the surface. The limiter mechanism 400 is constructed such that the limiter tab 227 and the load beam 203 are normally spaced from each other to avoid contact of the two. According to this construction, it is possible to prevent the generation of dust caused by unnecessary contact between the limiter tab 227 and the load beam 203. Consequently, in the hard disk drive, it is possible to effectively prevent the occurrence of head crash caused by the presence of dust between the head and the medium. The limiter tab 227 is disposed in such a manner that a part thereof located on the back surface of the load beam is opposed to the back surface of the load beam with a predetermined gap (g) defined therebetween. The limiter tab 227 has a limiter tab aperture 301 and the limiter mechanism 400 is constructed so that the projecting portion 223 of the restrictive aperture 222 extends through the limiter tab aperture 301.

Figure 6:
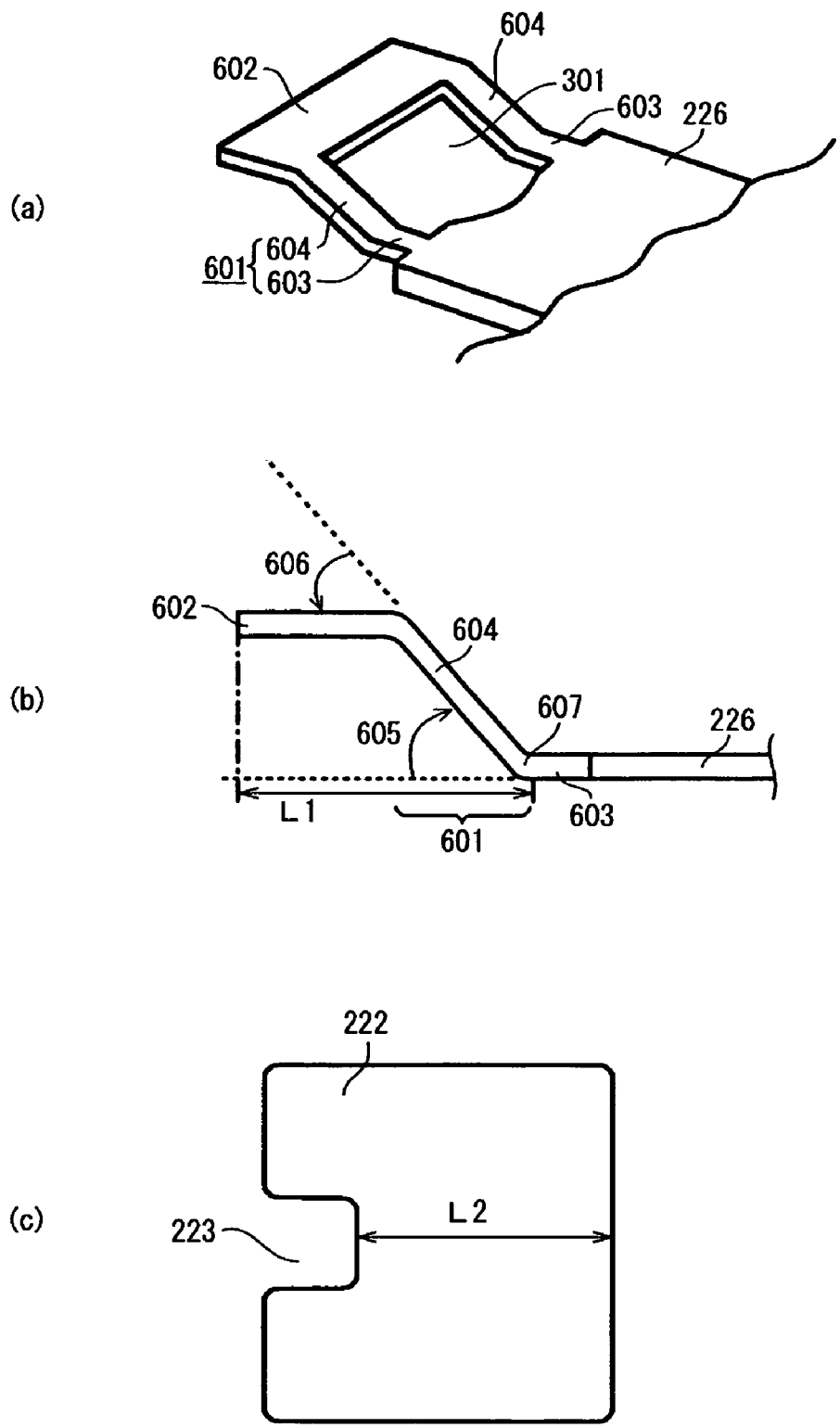
FIG. 6 is a view showing the construction of a limiter tab and that of a restrictive aperture in the embodiment.

FIGS. 6A and 6B illustrate the construction of the limiter tab 227 and FIG. 6C illustrates the construction of the restrictive aperture 222. The limiter tab 227 has a limiter tab arm portion 601 extending from the rear end of the gimbal tongue 226 and an opposed portion 602 opposed to the back side of the load beam 203, the opposed portion 602 being bent at a predetermined angle from the limiter tab arm portion 601 and extending toward the rear portion of the load beam 203. The limiter tab arm portion 601 has a base portion 603 extending substantially horizontally from the rear end of the gimbal tongue 226 and a piercing portion 604 bent at a predetermined angle from the base portion 603 and extending through the restrictive aperture 222.

The opposed portion 602 bends at a predetermined angle from the piercing portion 604, extends toward the rear portion of the load beam 203, and faces the back side of the load beam 203. The limiter tab aperture 301 formed in the limiter tab 227 is defined by one ends of the gimbal tongue 226, base portion 603, piercing portion 604 and opposed portion 602. Since the limiter tab 227 has the limiter tab aperture 301, it is possible to reduce the weight of the limiter tab 227 and ensure a good dynamic characteristic of the head 105.

The base portion 603 and the piercing portion 604 are each composed of two sub-portions formed in a sandwiching relation to the limiter tab aperture 301. At a bending angle 605 of 90° or less the piercing portion 604 bends and extends from the base portion 603. As shown in FIG. 6B, the bending angle 605 represents an angle at which the piercing portion 604 is bent from a parallel state. The larger the bending, the larger the bending angle 605. In the example being considered, the bending direction of the opposed portion 602 relative to the piercing portion 604 is opposite to the bending direction of the piercing portion 604 relative to the base portion 603. At a bending angle of 90° or less the opposed portion 602 bends and extends from the piercing portion 604.

The opposed surface of the opposed portion 602 relative to the load beam 203 and the back side of the load beam are normally spaced from each other by a predetermined distance. Preferably, the limiter mechanism 400 is formed so that the opposed surface of the opposed portion 602 relative to the load beam may be approximately parallel to the back side of the load beam. If the limiter tab is formed so that the piercing portion 604 is bent and extends from the gimbal tongue 226, the base portion 603 can be omitted from the limiter tab arm 601.

It is preferable that the distance L1 in the longitudinal direction of the load beam 203 from an end of the piercing portion 604 on the side of the base portion 603 to the front end of the opposed portion 602 be shorter than the distance L2 from the front end of the projecting portion 223 in the restrictive aperture 222 to the opposite end of the restrictive aperture 222. Since the distance from a bent portion 607 between the piercing portion 604 and the base 603 up to the front end of the opposed portion 602 is shorter than the distance from the front end of the projecting portion 223 up to the opposite end of the restrictive aperture 222, the limiter tab 227 can be inserted into the restrictive aperture 222 after the limiter tab 227 is bent into a required shape in the manufacturing process. As a result, it is no longer required to perform press working for the limiter tab 227 after insertion of the limiter tab 227 into the restrictive aperture 222 and thus it is possible to improve the production efficiency.

The function and operation of the limiter mechanism 400 in this embodiment will now be described with reference to FIGS. 7A, 7B and 7C. The suspension may undergo a weak or strong shock during conveyance or during the assembling work. During unloading, in order for the rotating magnetic disk 101 and the head 105 to be spaced from each other, it is necessary to draw apart the head against the attractive force. In the limiter mechanism 400, the motion of the head 105 is restricted against an external shock or against the attractive force acting between the head 105 and the magnetic disk 101, whereby the head 105 or the suspension 110 can be effectively prevented from being damaged.

Figure 7:
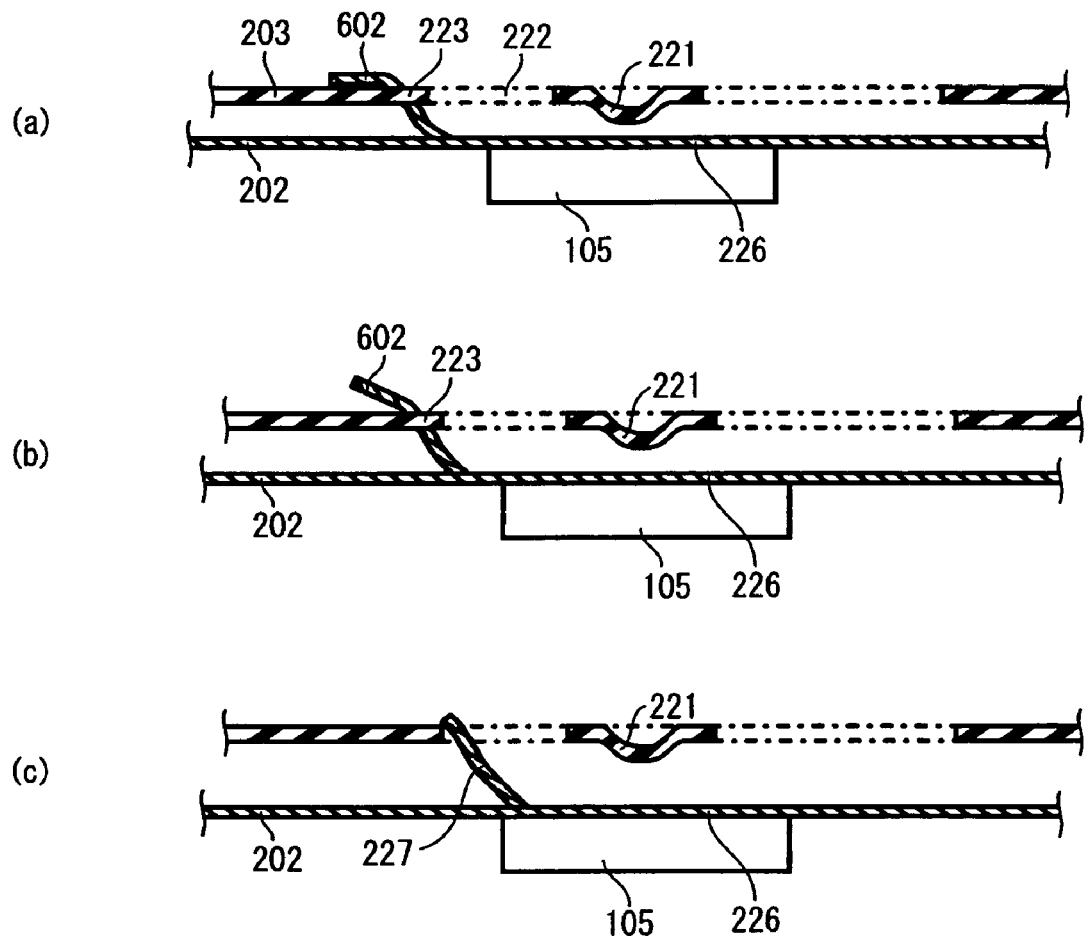
FIG. 7 is a view showing functional motions of the limiter mechanism.

FIG. 7A shows the state of the limiter mechanism 400 in case of a weak shock being applied to the suspension 110 or in case of pulling up the head 105 from above the magnetic disk 101 during unloading. FIG. 7B shows the state of the limiter mechanism 400 in case of a strong shock being applied to the suspension 110. FIG. 7C shows the state of a limiter mechanism in case of a strong shock being applied to the suspension, the limiter mechanism having no projecting portion in the restrictive aperture and being shown as a comparative example relative to the limiter mechanism in this embodiment.

As shown in FIG. 7A, when a weak shock is applied to the suspension 110, the gimbal arms 229 are slightly deformed and the opposed surface of the opposed portion 602 formed in the limiter tab 227 relative to the load beam come into contact with each other. As a result, the gimbals 202 can be prevented from being largely deformed by the shock in a direction in which it is drawn apart from the load beam 203, i.e., in the downward direction in FIG. 6, or the head 105 can be prevented from moving largely. Likewise, during unloading, by mutual contact as necessary between the opposed surfaces of the load beam 203 and the opposed portion 602 of the limiter tab, it is possible to effectively assist the operation for drawing out the head 105. In particular, since the movement of the head 105 or deformation of the gimbals 202 is restricted by surface contact between the load beam 203 and the limiter tab 227, it is possible to effectively suppress the generation of dust caused by contact between the limiter tab 227 and the load beam 203.

The limiter mechanism 400 has the projecting portion 223 formed in the restrictive aperture 222. As shown in FIG. 7B, under a strong shock, the limiter tab 227 is deformed and the projecting portion 223 of the restrictive aperture 222 and an end of the limiter tab aperture 301 come into contact with each other. The projecting portion 223 retains the limiter tab 227 to prevent a further deformation of the gimbals 202. Since the limiter tab 227 has elasticity, when receiving a strong shock, the limiter tab 227 is deformed so as to diminish the bending angle between the opposed portion 602 and the piercing portion 604. As a result, the projecting portion 223 and an end of the limiter tab aperture 301 come into contact with each other and the limiter tab 227 is retained by the projecting portion 223.

As shown in FIG. 7C, in the limiter mechanism having no projecting portion in the restrictive aperture 222, it is impossible to retain the limiter tab 227, so that the limiter tab 227 comes off from the restrictive aperture 222. Consequently, the gimbals 202 is largely deformed and it is impossible or very difficult to prevent damage to the head 105. On the other hand, according to the limiter mechanism 400 in this embodiment, the limiter tab 227 is deformed, whereby the projecting portion 223 of the restrictive aperture 222 and an end of the opposed portion 602 on the side of the limiter tab aperture 301 are put in contact with each other and hence the projecting portion 223 can retain the opposed portion 602. Thus, even under a strong external shock, the head 105 can be effectively prevented from largely moving in a direction away from the load beam 203 and it is possible to attain high impact resistance.

For the purpose of provision of a function of retaining the limiter tab 227 against a strong shock, a projecting portion for retaining the limiter tab 227 may be formed at the front end of the restrictive aperture 222 (side end of the tab 116 the load beam or an opposed end of the projecting portion 223). In this case, the opposed portion 602 is bent in the opposite direction relative to the construction described above. That is, the opposed portion 602 of the limiter tab 227 is bent toward the front side (the tab side of the load beam). Also in this construction, against a weak shock, deformation of the gimbals 202 can be restricted by surface contact between the opposed portion 602 of the limiter tab 227 and the load beam 203, while against a strong shock, deformation of the gimbals 202 can be restricted because the limiter tab 227 is retained by the projecting portion. In this construction, however, it is necessary that the limiter tab 227 be bent largely, and therefore the construction described above in connection with drawings is preferred from the standpoint of ease of manufacture.

For example, the limiter mechanism 400 can be formed by utilizing the aperture 219 as a restrictive aperture. However, as described above in connection with drawings, it is preferable that the limiter mechanism 400 be formed behind the head 105. The limiter mechanism 400 is formed behind the head-disposed position (on the side of the pivot center 215) in the gimbals 202 to cooperate with the gimbal tab 224 formed in front of the head 105, so that an undesirable motion of the head 105 caused by an external shock can be restricted more effectively. Although in this embodiment the gimbals 202 and the load beam 203 are formed as separate members, the present invention is also applicable to a suspension wherein both such members are formed integrally. These points are also true for the following description.

It is preferable that the projecting portion 223 be as long as possible in order to further ensure locking of the limiter tab 227. The projecting portion 223 need not always extend through the limiter tab aperture 301 normally insofar as it can retain the limiter tab 227. As noted above, in order that the bent limiter tab 227 can be easily inserted into the restrictive aperture 222, it is preferable that the length of the projecting portion 223 be determined appropriately from the relation between the size of the limiter tab 227 and that of the restrictive aperture 222.

Figure 8:
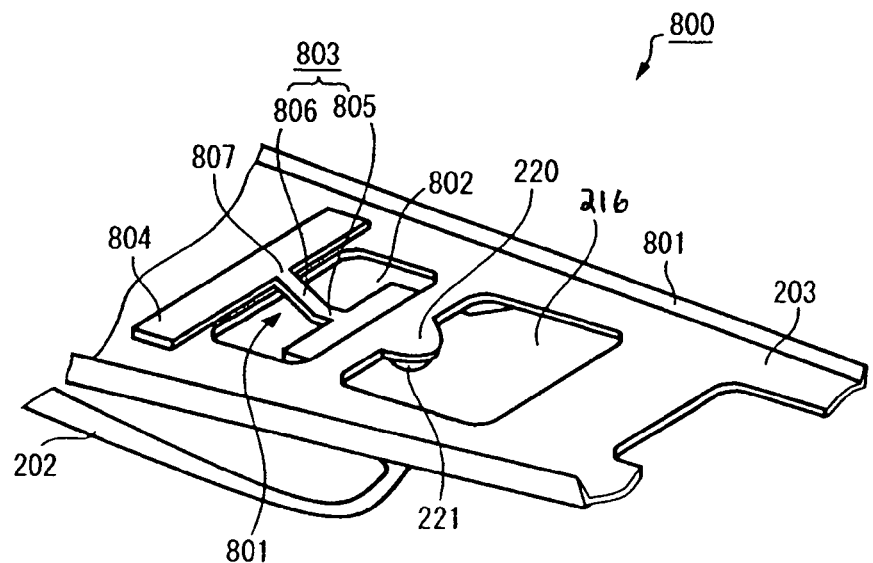
FIG. 8 is a view showing the construction of a limiter mechanism according to another embodiment of the present invention.
Figure 9:
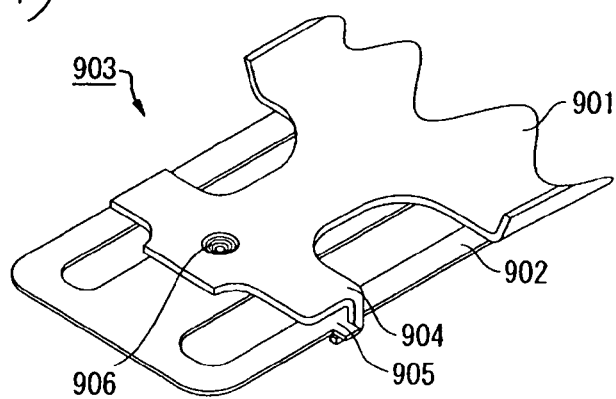
FIG. 9 is a plan view showing the construction of a conventional limiter mechanism.

FIG. 8 shows a limiter mechanism according to another embodiment of the present invention. In the limiter mechanism, indicated at 800, according to this embodiment, the shape of a limiter tab 801 is different from that in the above embodiment. The limiter mechanism 800 does not have a projecting portion in a restrictive aperture 802. FIG. 8 shows the construction of the limiter mechanism 800 in an assembled state of the suspension 110. Further, FIG. 8 shows the construction of the limiter mechanism 800 in a normal state. As shown in FIG. 8, the limiter mechanism 800 has a T-shaped limiter tab 801 formed on the gimbals 202 and a restrictive aperture 802 formed in the load beam 203. The restrictive aperture 802 does not have any projecting portion.

The limiter tab 801 extends from the rear end of the gimbal tongue 226 and further extends through the restrictive aperture 802 from the surface of the load beam 203 opposed to the gimbals 202 toward the back side of the load beam. The limiter tab 801 has a limiter tab arm portion 803 extending from the rear end of the gimbal tongue and an opposed portion 804 contiguous to the limiter tab arm portion 803 and opposed to the back side of the load beam 203. The limiter tab arm portion 803 has a base portion 805 extending substantially horizontally from the center of the rear end of the gimbal tongue 226 and a piercing portion 806 bending and extending at a predetermined angle from the base portion 805 and further extending through the restrictive aperture. The opposed portion 804 bends at a predetermined angle from the piercing portion 806, extends toward the rear portion of the load beam 203, and faces the back side of the load beam 203. The piercing portion 806 (the limiter tab arm portion 803) is formed so that its width (the length in edge direction of the load beam 203) is smaller than that of the opposed portion 804, thus permitting contribution to the reduction in weight of the limiter tab 801.

The piercing portion 806 is bent and extends from the base portion 805 at a bending angle of 90° or less. The bending direction of the opposed portion 804 relative to the piercing portion 806 is opposite to the bending direction of the piercing portion 806 relative to the base portion 805. The opposed portion 804 is bent and extends from the piercing portion 806 at a bending angle of 90° or less. The opposed surface of the opposed portion 804 relative to the load beam and the back side of the load beam are normally spaced from each other by a predetermined distance, whereby it is possible to prevent the generation of dust caused by unnecessary contact between the limiter tab 801 and the back side of the load beam.

The limiter mechanism 800 is formed so that the opposed surface of the opposed portion 804 relative to the load beam and the back side of the load beams are substantially parallel to each other. The width of the opposed portion 804 in the edge direction of the load beam 203 is larger than that of the restrictive aperture 802. In the manufacturing process, the limiter tab 801 is inserted into the restrictive aperture 2 in a partially bent state of the opposed portion 804 and thereafter the opposed portion 804 is expanded by press working, whereby the limiter mechanism 800 of such a construction as shown in FIG. 8 can be formed.

The function and operation of the limiter mechanism 800 in this embodiment are similar to those of the limiter mechanism 400 described above. Under a weak shock or during unloading, the opposed surface of the opposed portion 804 relative to the back side of the load beam come into contact with each other, whereby deformation of the gimbals 202 and movement of the head 105 are restricted. On the other hand, under a strong shock, the limiter mechanism 800 having elasticity is deformed and the opposed portion 804 is retained by the load beam 203, whereby an excessive deformation of the gimbals 202 is prevented. That is, the limiter tab 801 is deformed in such a manner that a bent portion 807 located between the opposed portion 804 and the piercing portion 806 is stretched, and a front end of the opposed portion 804 (the end on the side of the piercing portion 806) comes into contact with the back side of the load beam 203, whereby the back side of the load beam 203 functions as a retaining portion and the limiter tab 801 is retained by the load beam 203. As a result, an excessive deformation of the gimbals 202 and the resulting excessive motion of the head 105 can be restricted.

In the limiter mechanism 800, under a weak shock or during unloading, the motion of the head 105 is restricted by surface contact between the opposed portion 804 and the back side of the load beam 203, so that it is possible to suppress the generation of dust caused by contact in the limiter mechanism 800. Also against a strong shock, an excessive motion of the head 105 can be prevented effectively because the opposed portion 804 of the limiter tab 801 can be retained by the load beam 203. The present invention is applicable not only to the hard disk drive but also to other various types of storage disk drives which rotate a data storage disk, such as an optical disk drive.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A suspension for holding a head adapted to access data stored in a medium, comprising:
   a deformable gimbals which holds said head; and
   a load beam which holds said gimbals on a first surface thereof, said load beam having a restrictive aperture;
   wherein said gimbals includes a limiter tab extending through said restrictive aperture from a side of said first surface to a side of a back surface of the first surface;
   wherein said limiter tab includes a limiter tab aperture, a base portion, arm portion, and an opposed portion having an opposed surface opposed to said back surface, said opposed surface being configured to contact part of said back surface to restrict deformation of said gimbals in a direction away from said first surface at a first amount of deformation; and
   wherein said load beam includes a retaining portion projecting toward and extending horizontally through the center of said limiter tab aperture and configured to retain said opposed portion at a position different from said part of said back surface to restrict deformation of said gimbals in a direction away from said first surface at a second amount of deformation which is larger than said first amount of deformation;
   wherein said arm portion of said limiter tab extends and bends diagonally from said base portion from a parallel state in a direction other than orthogonal or perpendicular from said base portion.

2. A suspension according to claim 1, wherein said opposed surface of said opposed portion is opposed to said part of the back surface of said load beam with a gap defined therebetween.

3. A suspension according to claim 2, wherein:
   said retaining portion has a projecting portion formed at an end of said restrictive aperture; and
   said projecting portion comes into contact with an end of said limiter tab aperture so that said retaining portion may retain said limiter tab.

4. A suspension according to claim 2, wherein said limiter tab is formed in such a manner that said opposed surface and said back surface are substantially parallel to each other.

5. A suspension according to claim 2, wherein:
   said limiter tab has a limiter tab arm portion extending through said restrictive aperture from the side of said first surface to the side of said back surface; and
   said opposed portion is bent from said limiter tab arm portion and extends so that said opposed surface may be opposed to said back surface with a gap defined therebetween.

6. A suspension according to claim 2, wherein:
   said gimbals has a gimbal tongue to which said head is fixed; and
   said limiter tab is formed at a rear end of said gimbal tongue.

7. A suspension according to claim 6, wherein:
   said limiter tab includes a limiter tab arm portion, which extends through said restrictive aperture from the side of said first surface to the side of said back surface side and which is bent relative to said gimbal tongue;
   said opposed portion is bent relative to said limiter tab arm portion in a direction opposite to the bent direction of the limiter tab arm portion;
   said retaining portion has a projecting portion formed at a rear end of said restrictive aperture; and
   said projecting portion comes into contact with an end of said limiter tab aperture to allow said retaining portion to retain said limiter tab.

8. A suspension according to claim 7, wherein a distance, in a longitudinal direction of said load beam, between the first surface-side bent portion of said limiter tab arm portion and a rear end of said opposed portion, is shorter than a distance, in the longitudinal direction of said load beam, between an end of said restrictive aperture to which said opposed portion is opposed and a front end of said projecting portion.

9. A suspension according to claim 1, wherein:
said gimbals has a gimbal tongue to which said head is fixed; and
said limiter tab is formed on a rear side of said gimbal tongue.

10. A suspension according to claim 9, wherein said gimbals further has a gimbal tab projecting at a front end of the gimbals.

11. A suspension according to claim 1, wherein:
said retaining portion includes a projecting portion, which is formed at an end of said restrictive aperture and which extends through said limiter tab aperture; and
said projecting portion comes into contact with an end of said limiter tab aperture to allow said retaining portion to retain said limiter tab.

12. A data storage device comprising:
a storage disk for storing data therein;
a head adapted to access the data stored in said storage disk; and
an actuator for moving said head for access to said storage disk, said actuator having a suspension for holding said head and a drive mechanism which generates a driving force for moving said head;
wherein said suspension comprises a deformable gimbals which holds said head; and a load beam which holds said gimbals on a first surface thereof, said load beam having a restrictive aperture;
wherein said gimbals includes a limiter tab extending through said restrictive aperture from a side of said first surface to a side of a back surface of the first surface;
wherein said limiter tab includes a limiter tab aperture, a base portion, arm portion, and an opposed portion having an opposed surface opposed to said back surface, said opposed surface being configured to contact part of said back surface to restrict deformation of said gimbals in a direction away from said first surface at a first amount of deformation; and
wherein said load beam includes a retaining portion projecting toward and extending horizontally through the center of said limiter tab aperture and configured to retain said limiter tab to restrict deformation of said gimbals in a direction away from said first surface at a second amount of deformation which is larger than said first amount of deformation;
wherein said arm portion of said limiter tab extends and bends diagonally from said base portion from a parallel state in a direction other than orthogonal or perpendicular from said base portion.

13. A data storage device according to claim 12, wherein said opposed surface is opposed to said back surface of said load beam with a gap defined therebetween.

14. A data storage device according to claim 13, wherein said limiter tab is formed in such a manner that said opposed surface is substantially parallel to said back surface.

15. A data storage device according to claim 12, wherein said retaining portion retains said opposed portion at a portion different from said opposed surface to restrict deformation of said gimbals.

16. A data storage device according to claim 12, wherein:
said gimbals is formed with a gimbals aperture;
said gimbals has a gimbal tongue, which projects from an end of said gimbals aperture on a side opposite to said drive mechanism and which is secured to said head; and
said limiter tab is formed at an end of said gimbal tongue on a side of said drive mechanism.

17. A data storage device according to claim 16, further comprising a ramp mechanism to which said head is retracted;
wherein a tab is formed at a front end of said load beam, and said tab comes into contact with a surface of said ramp mechanism, thereby causing said actuator to rest on said ramp mechanism.

18. A data storage device according to claim 17, wherein a gimbal tab is formed at a front tip of said gimbals with a gap defined between said gimbal tab and the surface of said ramp mechanism so as to come in contact with the surface of said ramp mechanism for restricting deformation of said gimbals.

19. A data storage device according to claim 12, wherein:
said gimbals has a gimbal tongue to which said head is fixed;
said limiter tab is formed on a rear side of said gimbal tongue; and
said gimbals further has a gimbal tab projecting at a front end of the gimbals.

20. A data storage device according to claim 12, wherein:
said retaining portion includes a projecting portion, which is formed at an end of said restrictive aperture and which extends through said limiter tab aperture; and
said projecting portion comes into contact with an end of said limiter tab aperture to allow said retaining portion to retain said limiter tab.

* * * * *